Patented Jan. 11, 1949

2,459,135

UNITED STATES PATENT OFFICE 2,459,135

PURIFICATION OF CARBAZOLE

Bernard W. Rottschaefer, East Greenbush, N. Y., assignor to General Aniline & Film Corporation, New York, N. Y., a corporation of Delaware No Drawing. Application February 3, 1945, Serial No. 576,153

4 Claims. (Cl. 260—318)

The present invention relates to a method of purifying carbazole and is particularly concerned with a method for purifying synthetic carbazole produced from 2-amino diphenyl, which contains an appreciable amount of unchanged 2-amino diphenyl.

The prior art processes which have been heretofore employed for purification of carbazole have, in general, either failed to produce a product having the desired degree of purity or have resulted in some loss of carbazole. In addition, the purified carbazole has frequently been obtained in a fluffy form which is relatively difficult to handle in many technical applications.

It is, therefore, an object of the present invention to provide a simplified method of purifying carbazole by means of which a very pure product is recovered quantitatively and by means of which the carbazole is obtained in a dense, sandy form which may be readily handled. Other and further objects will be apparent as the present description progresses.

Briefly stated, the purification process of the present invention comprises dissolving the carbazole in a water-immiscible organic solvent. A dilute mineral acid is then added to the thus-formed solution in order to extract the acid soluble impurities therefrom. Subsequently, the organic solvent is removed by distillation, whereby there is obtained a slurry of carbazole in a dense, easily filterable form in the acid-aqueous liquor in which the impurities remain dissolved. Finally, the carbazole is isolated from the acid aqueous liquor, advantageously by filtration, and may be washed free from the mother liquor with hot water, and dried.

The details of this invention will be readily understood from a consideration of a specific example of a preferred method of practicing the same.

A 5 liter round-bottomed flask is charged with 3000 grams of chlorobenzene and 600 grams of impure synthetic carbazole containing about 1% 2-amino diphenyl are then added. The charge is then heated to reflux, and the charge agitated until the impure carbazole is substantially dissolved in the chlorobenzene. A temperature of 130–135° C. is usually obtained. The solution may then be allowed to cool slightly, to about 90° C., and there is then added a mixture of 25 cc. of 45% sulfuric acid in 700 cc. of water. The reaction mixture should show a strong test for free mineral acid at this point, i. e., the pH of the mixture should be 2 or lower. The chlorobenzene is then steam distilled off by passing steam through the charge. During this operation, it is advantageous, although not necessary, to agitate the charge. As the chlorobenzene is distilled off, water should be added in sufficient amount so as to maintain the volume of the charge substantially constant. As the chlorobenzene is removed during the distillation, the carbazole precipitates in a dense sandy form, while the impurities remain dissolved in the acid liquor so that after complete removal of the chlorobenzene, there remains in the flask a slurry of dense, crystalline carbazole in the acid liquor in which the impurities are dissolved. The carbazole is then isolated from the acid liquor by filtration, washed with hot water until neutral and dried. The yield was 595 grams of purified carbazole.

While the foregoing is a detailed description of a preferred method of practicing the present invention, it will be apparent to those skilled in the art that various modifications may be made therein without departure from the principles of this invention. In order to complete the description of the present invention, certain of the more important modifications which may be made therein are mentioned below:

The water-immiscible organic solvent employed in the process should be used in sufficient amount to completely, or almost completely, dissolve the carbazole at the temperature at which it is used. Such complete solution is desirable, since it removes from the interior of the impure carbazole crystals those impurities which are later soluble in acid. It is also preferable to effect the solution of the carbazole at a temperature near the reflux temperature of the organic solvent, since the solubility of the carbazole increases with increasing temperatures and when relatively high temperatures are employed for solution, smaller amounts of solvent are required to effect complete solution, and, therefore, less solvent must subsequently be removed by distillation. The use of larger amounts of solvent does not affect the operability of the process but constitutes an unnecessary load thereon. The solvent selected should preferably be one which is relatively volatile in order that it may be readily removed by distillation which advantageously may be steam distillation. Among the solvents for carbazole which are satisfactory for practicing the process are chlorinated benzene derivatives, such as chlorobenzene, orthodichlorobenzene, and trichlorobenzene, or other water-immiscible organic solvents, such as benzene, toluene, and xylene. In general, the selection of a particular solvent will be governed by economic considerations and the amount of any specific solvent which should be used can readily be ascertained.

The acid which is employed for dissolving the impurities present in the carbazole may be any strong mineral acid and should be of such strength that a clear blue test on Congo paper is obtained. This means a pH no higher than 1 to 2. At the same time, too high a concentration of acid is not desirable, since this tends to salt out the impurities. The optimum concentrations of any specific acid for maximum solubility of the impurities can readily be determined. The amount of dilute acid which is required will depend both on the final volume of the charge before filtration and on the amounts of the acid soluble impurities present in the impure carbazole. A sufficient amount of acid should be used to dissolve the impurites present and to obtain a readily stirrable and handable slurry of carbazole in acid before filtration. This can readily be determined for any particular sample of impure carbazole. While sulfuric acid is preferably used in practicing the present invention, since it is readily available and is not volatile with steam, other strong mineral acids, such as hydrochloric and phosphoric acid, may be used. However, when a volatile acid, such as hydrochloric acid, is employed, any acid lost during the steam distillation should be replaced, and thus an unnecessary complication is introduced into the process.

Various other modifications, which may be made in the process without departing from the spirit thereof or the scope of the appended claims, will be apparent.

I claim:

1. The method of purifying carbazole containing 2-amino diphenyl as an impurity which comprises dissolving said impure carbazole in a water-immiscible volatile organic solvent therefor, mixing the thus-formed solution with a dilute aqueous solution of a strong mineral acid in an amount sufficient to dissolve said amino diphenyl present in said carbazole and of such predetermined concentration that the resulting mixture has a pH less than 2 and said amino diphenyl is soluble while carbazole is insoluble therein, distilling off the organic solvent from said mixture while maintaining the amount of acid in said mixture being distilled substantially constant and adding water to maintain the volume of said mixture substantially constant, thereby producing a slurry of carbazole in dilute acid, and separating said dilute acid with said amino diphenyl dissolved therein from said carbazole.

2. The process of purifying carbazole containing 2-amino diphenyl as an impurity which comprises dissolving said impure carbazole in chlorobenzene, mixing the thus-formed solution with a dilute aqueous solution of a strong mineral acid in an amount sufficient to dissolve said amino diphenyl present in such carbazole, said dilute acid being of such predetermined concentration that the resulting mixture of carbazole impurities, dilute mineral acid and chlorobenzene has a pH less than 2 and said amino diphenyl is soluble while carbazole is insoluble therein, distilling off the chlorobenzene from said mixture while maintaining the amount of acid in said mixture being distilled substantially constant and adding water to maintain the volume of said mixture substantially constant, thereby producing a slurry of carbazole in dilute acid, and separating said dilute acid with said amino diphenyl dissolved therein from said carbazole.

3. The method of purifying carbazole containing 2-amino diphenyl as an impurity which comprises dissolving said impure carbazole in a water-immiscible volatile organic solvent therefor, mixing the thus-formed solution with dilute aqueous sulfuric acid in an amount sufficient to dissolve said amino diphenyl present in said carbazole, said dilute sulfuric acid being of about 2% concentration so that the resulting mixture of carbazole impurities, chlorobenzene and dilute sulfuric acid has a pH less than 2 and said amino diphenyl is soluble while carbazole is insoluble therein, distilling off the organic solvent from said mixture while adding water to maintain the volume of said mixture substantially constant, thereby producing a slurry of carbazole in dilute acid, and separating said dilute acid with said amino diphenyl dissolved therein from said carbazole.

4. The method of purifying carbazole containing 2-amino diphenyl as an impurity which comprises dissolving said impure carbazole in chlorobenze, mixing the thus-formed solution with dilute aqueous sulfuric acid in an amount sufficient to dissolve said amino diphenyl present in said carbazole, said dilute sulfuric acid being of about 2% concentration so that the resulting mixture of carbazole impurities, chlorobenzene and dilute sulfuric acid has a pH less than 2 and said amino diphenyl is soluble while carbazole is insoluble therein, distilling off the chlorobenzene from said mixture while adding water to maintain the volume of said mixture substantially constant, thereby producing a slurry of carbazole in dilute acid, and separating said dilute acid with said amino diphenyl dissolved therein from said carbazole.

BERNARD W. ROTTSCHAEFER.

REFERENCES CITED

The following references are of record in the file of this patent:

UNITED STATES PATENTS

| Number | Name | Date |
|---|---|---|
| 1,831,059 | Daniels | Nov. 10, 1931 |
| 2,242,842 | Weinmayr | May 20, 1941 |

FOREIGN PATENTS

| Number | Country | Date |
|---|---|---|
| 27,596 | Great Britain | 1904 |

OTHER REFERENCES

Chem. Abstr., vol. 32: 6439 (1938), citing: Org. Chem. Ind. (U. S. S. R.), vol. 4: 601–605 (1937).

Morgan et al.: J. Soc. Chem. Ind. (1938), 57:358–360.

Chem. Abstr., vol. 38: 382 (1944), citing British Patent 548,877 (Oct. 28, 1942).